US005398509A

United States Patent [19]

North et al.

[11] Patent Number: 5,398,509

[45] Date of Patent: Mar. 21, 1995

[54] GAS TURBINE ENGINE COMBUSTOR

[75] Inventors: Richard P. North, Derby; Christopher P. Madden, West Yorkshire; Christopher S. Parkin, Derby, all of England

[73] Assignee: Rolls-Royce, PLC, London, United Kingdom

[21] Appl. No.: 296,892

[22] Filed: Aug. 29, 1994

Related U.S. Application Data

[63] Continuation of Ser. No. 127,349, Sep. 28, 1993, abandoned.

[30] Foreign Application Priority Data

Oct. 6, 1992 [GB] United Kingdom ................. 9220937

[51] Int. Cl.[6] ................................................ F02C 3/14

[52] U.S. Cl. .......................................... 60/755; 60/752

[58] Field of Search .................. 60/39.11, 39.464, 266, 60/748, 752, 755, 756, 757, 759, 760; 110/264, 265

[56] References Cited

U.S. PATENT DOCUMENTS

| | | | |
|---|---|---|---|
| 2,659,201 | 11/1953 | Krejci | 60/755 |
| 4,429,538 | 2/1984 | Sato et al. | 60/755 |
| 4,702,073 | 10/1987 | Malconian | 60/755 |
| 5,129,231 | 7/1992 | Becker | 60/756 |
| 5,226,278 | 7/1993 | Meylan et al. | 60/752 |
| 5,233,828 | 8/1993 | Napoli . | |

*Primary Examiner*—Louis J. Casaregola

*Attorney, Agent, or Firm*—Cushman, Darby & Cushman

[57] ABSTRACT

A gas turbine engine combustor comprises a combustion chamber the walls of which have a plurality of holes extending therethrough for the flow of cooling air into the interior of the chamber. The holes are so configured and arranged that cooling air is exhausted from them in a flow direction which is normal or oblique to the general direction of gas flow through the chamber and oblique to the portion of the chamber wall local thereto.

5 Claims, 3 Drawing Sheets

GAS TURBINE ENGINE COMBUSTOR

This is a continuation of application Ser. No. 08/127,349, filed on Sep. 28, 1993, which was abandoned upon the filing hereof.

FIELD OF THE INVENTION

This invention relates to a gas turbine engine combustor and is particularly concerned with the manner in which such a combustor is provided with and utilizes air.

BACKGROUND OF THE INVENTION

A gas turbine engine combustor usually comprises a combustion chamber into which fuel is introduced at its upstream end through a fuel injection nozzle or nozzles. Air is introduced both at the upstream end and throughout the combustion chamber length. The air so introduced serves two purposes: it supports the combustion process which takes place within the chamber and it provides cooling of the chamber.

One of the ways in which air is introduced into the combustion chamber for cooling purposes is through holes located in the combustion chamber walls and also sometimes in a heat shield usually located at the upstream end of the chamber and surrounding the fuel injection nozzle. A combustion chamber cooled in this way is described in GB 2221979A. The holes are so arranged that those in the heat shield direct the air passing through them towards the fuel nozzle. Those holes in the combustion chamber walls are arranged so as to direct the air passing through them in a generally downstream direction. In both cases, the air forms a film on the internal surfaces of the walls, thereby ensuring that the walls do not overheat.

It is also known from NASA Technical Note NASA TN D-8248 "Streakline Flow Visualization of Discrete-Hole Film Cooling with Normal, Slanted and Compound Angle Injection" Raymond S. Colladay and Louis M. Russell, Lewis Research Center, Cleveland, Ohio 44135, Sep. 1976 to inject a flow of cooling air through slanted holes in a wall at an angle of 45° laterally to the main gas flow across the wall.

It has been found with this sort of arrangement for the introduction of air into the chamber that cooling is not as effective as is normally desirable for a given flow of air. Additionally carbon deposition can take place and it is sometimes difficult to ensure that harmful emissions from the chamber, that is those of carbon monoxide, unburned hydrocarbons, smoke and the oxides of nitrogen, are below statutory limits. These emissions tend to accumulate in the cooling air film and are swept out of the chamber in the film before they have chance to be consumed by the combustion process. A further problem is that in order to ensure effective cooling, relatively large amounts of air are required. This means that the amount of air for primarily taking part in the combustion process is limited, thereby giving rise to less than efficient combustion.

SUMMARY OF THE INVENTION

It is an object of the present invention to provide a gas turbine engine combustor in which air is used more effectively for combustor cooling and reducing harmful emissions.

According to the present invention, a gas turbine engine combustor comprises a combustion chamber defined by walls which, in operation, contain the combustion process and separate it from a region of pressurised air, said walls having a plurality of holes extending therethrough and through which, in operation, said air passes into said chamber, said holes being so configured and arranged as to direct said air into said chamber in a flow direction which is generally normal to the general direction of gas flow local thereto within said combustion chamber and oblique to the portion of the combustion chamber wall local thereto.

BRIEF DESCRIPTION OF THE DRAWINGS

The present invention will now be described, by way of example, with reference to the accompanying drawings in which.

DETAILED DESCRIPTION OF THE INVENTION

Figure 1:
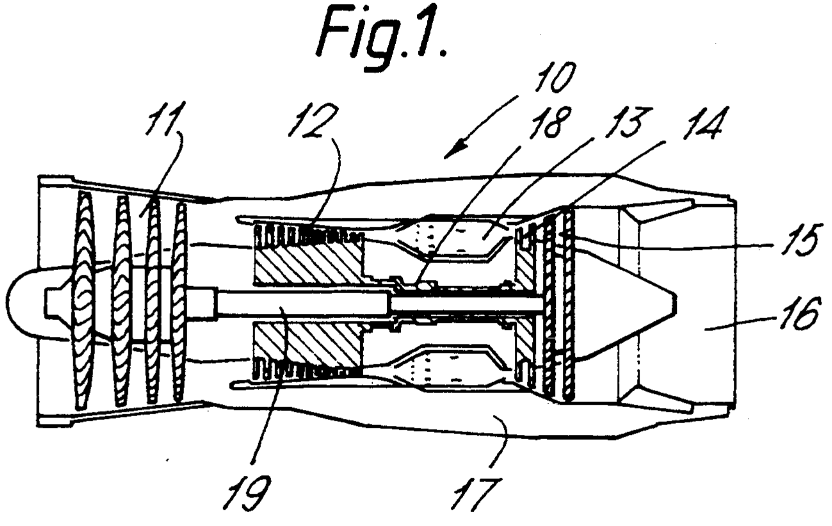
FIG. 1 is a sectioned side view of a gas turbine engine having a combustor in accordance with the present invention.

Referring to FIG. 1, a by-pass gas turbine engine generally indicated at 10 is of generally conventional configuration. It comprises low and high pressure compressors 11 and 12, combustion equipment 13, high and low pressure turbines 14 and 15 and an exhaust nozzle 16. Air compressed by the low pressure compressor 11 is divided into two flows. The first flow passes through an annular by-pass duct 17 positioned around the engine 10 to mix with engine exhaust gases in the exhaust nozzle 16. The second flow is directed into the high pressure compressor 12 where it is compressed further before being directed into the combustion equipment 13. There it is mixed with fuel and the mixture combusted. The resultant combustion products then expand through and thereby drive, the high and low pressure turbines 14 and 15 before being exhausted through the nozzle 16 to provide propulsive thrust.

The high and low pressure turbines 14 and 15 are respectively interconnected with, and thereby drive, the high and low pressure compressors 11 and 12 by drive shafts 18 and 19.

Figure 2:
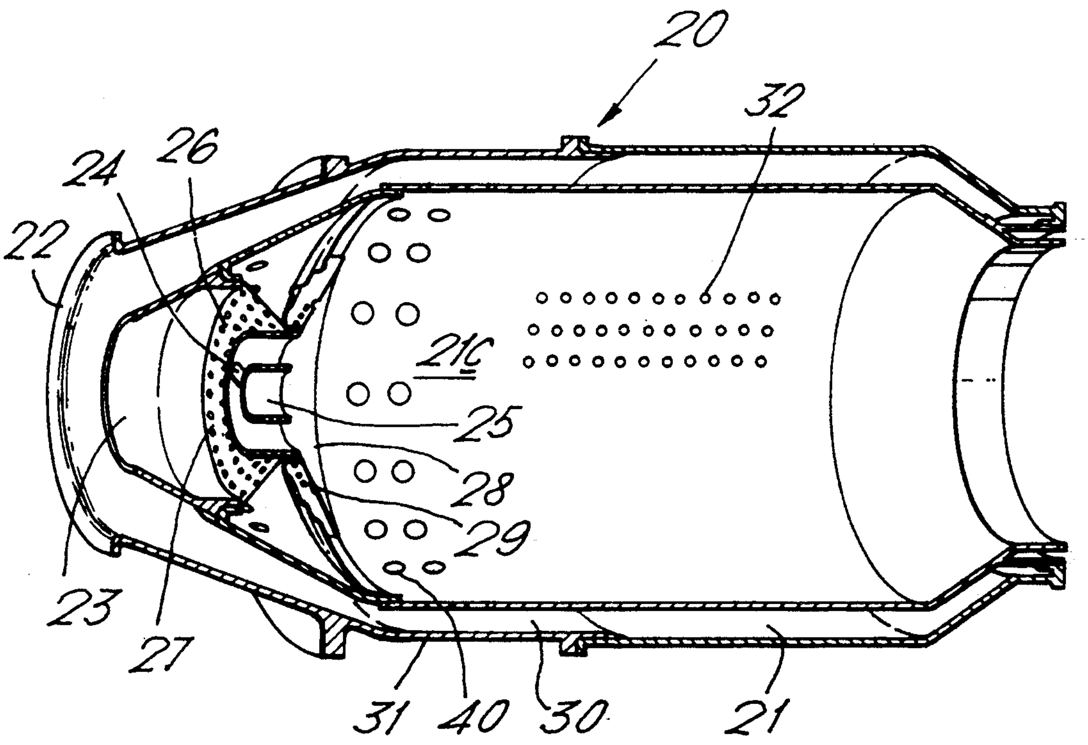
FIG. 2 is a sectioned side view of a combustor of the gas turbine engine shown in FIG. 1.

The combustion equipment 13 comprises a plurality of similar combustors 20 disposed in an annular array around the engine 10. Each combustor 20, as can be seen in FIG. 2, comprises a combustion chamber 21 which is designed to contain the combustion process.

Figure 3:
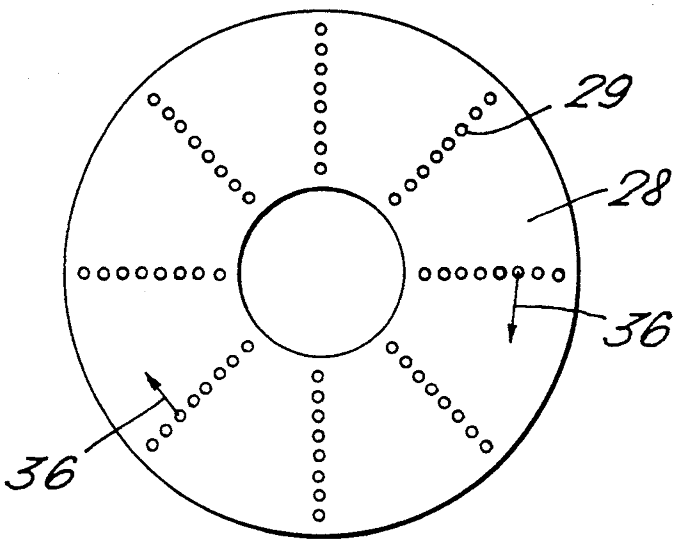
FIG. 3 is a view in an axial direction of the upstream end of the combustor shown in FIG. 2.

The upstream end 22 of the combustor 20 is, in operation, exposed to high pressure air exhausted from the high pressure compressor 12. That air flows into the combustor 20 and is divided into two flows. The first flow is into the combustion chamber 21 through a diffuser 23. Most of the air entering the combustion chamber 21 via the diffuser 23 does so via a plurality of swirler vanes 24 which surround a ring-shaped member 25 which in turn supports a fuel injection nozzle (not shown). The remainder of the air from the diffuser 23 flows through a plurality of holes 26 in the upstream wall 27 of the combustion chamber 21. The air then flows on to the upstream surface of a frustro-conical heat shield or head 28 (which can also be seen in FIG. 3) and which constitutes a part of the combustion chamber 21. From there it flows through a plurality of small holes 29 in the heat shield 28 and into the main combustion zone 21*a* combustion chamber 21.

The second flow is around the combustion chamber 21 exterior. The air flows through an annular space 30 which is defined by the chamber 21 and a surrounding structure 31. The air provides cooling of the exterior of the combustion chamber 21 as it flows through the space 30. Further cooling of the chamber 21 takes place as some of the air flows through a large number of small holes 32 which extend through the chamber 21 wall. Although only a small area of the holes 32 is shown in FIG. 2, it will be appreciated that they are in fact distributed over a major portion of the chamber 21.

The remainder of the air flows into the chamber 21 through several larger holes 40 located towards the upstream end of the chamber 21. This air is not specifically for cooling but is instead directed into the combustion zone 21*a*.

Air passing through the holes 32 initially forms a film of cooling air across the internal surface of the chamber 21, thereby providing further cooling of the chamber 21. The air then takes part in the combustion process which in operation proceeds within the combustion zone 21 of the chamber 21.

The holes 32 are specifically arranged and configured to direct cooling air into the interior of the chamber 21 in a direction which is not aligned with the general direction of the gas flow through the chamber 21. Thus the general direction of the gas flow through the chamber 21 is essentially axial (with respect to the longitudinal axis of the engine 10). However the holes 32 are arranged so that they direct cooling air into the interior of the chamber 21 generally normal to that flow. Additionally the holes 32 are arranged so that the cooling air flow which they exhaust is in a direction which is generally oblique to the internal surface of the chamber 21. This is so as to ensure that the air, at least initially, flows as a film over that internal surface, thereby cooling it.

Figure 5:
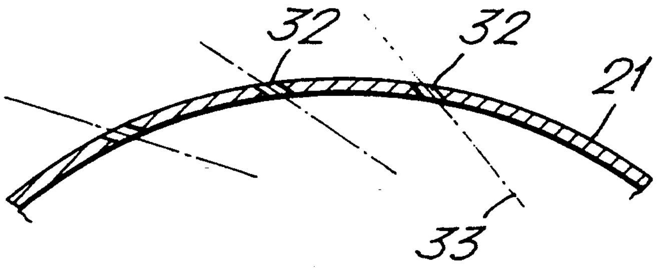
FIG. 5 is a sectional view in an axial direction of a portion of the wall of the combustor shown in FIG. 2.
Figure 6:
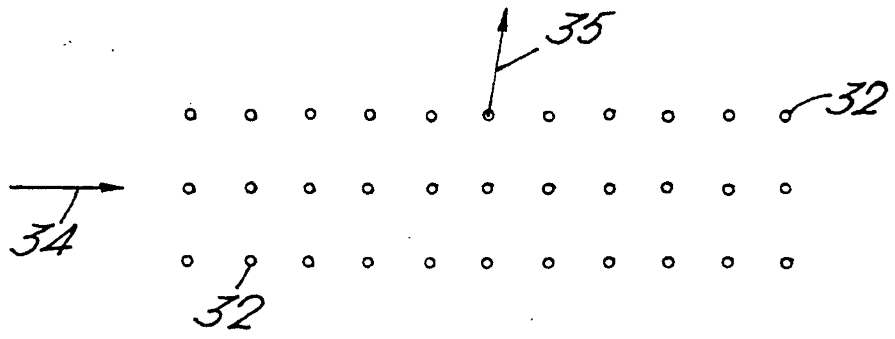
FIG. 6 is a view of the arrangement of cooling air holes in the wall of the combustor shown in FIG. 2.
Figure 7:
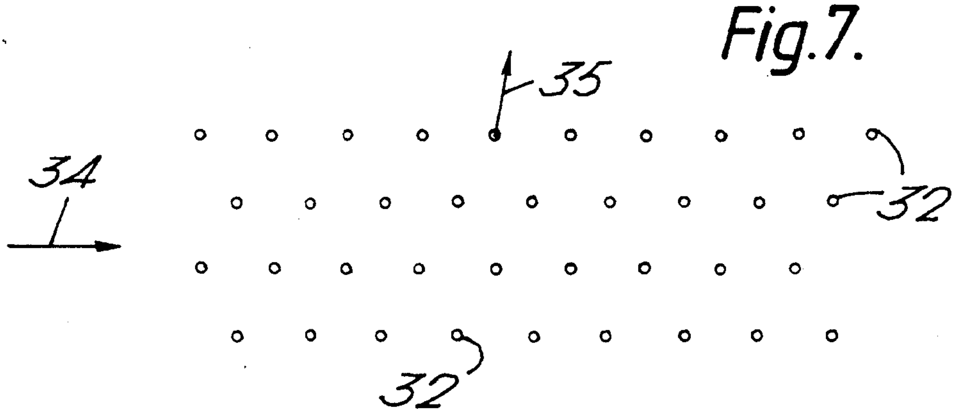
FIG. 7 is an alternative configuration for the cooling holes arrangement shown in FIG. 6.

The arrangement of the holes 32 can be seen more clearly if reference is now made to FIGS. 5, 6 and 7.

FIG. 5 shows the axes 33 of the holes 32 oblique to the wall of the chamber 21 so as to facilitate the establishment of a cooling air film over the internal surface of the chamber 21 wall. FIG. 5 also shows how the holes 32 are configured so as to direct cooling air in a direction which is generally normal to the general gas flow direction in the chamber 21. This ensures that the air flows in a generally circumferential direction within the chamber 21, initially in the form of a film adjacent the chamber 21 internal surface.

FIG. 6 and 7 also show this generally circumferential flow with arrows 34 indicating the general gas flow direction in the chamber 21, and arrows 35 the direction of flow of the cooling air as it exits the holes 32. In FIGS. 6 and 7 the cooling air flow is indicated by the arrows 35 is shown as being generally normal to the general gas flow direction 34.

FIGS. 6 and 7 also show that the holes 32 can be arranged in any suitable configuration. Thus whereas in FIG. 6 they are arranged in rows in FIG. 7 they are arranged in an array.

The cooling air holes 29 in the heat shield 28 are arranged in radially extending rows and are configured in the same general manner as the holes 32 although they could be arranged in arrays if so desired. They direct the cooling air in a generally circumferential direction as indicated by the arrows 36 in FIG. 3. The cooling air thus flows around the axis of the fuel injector which is positioned in operation at the upstream end of the combustion chamber 21.

This flow brings important advantages to the operation of the combustion chamber 21. Specifically the effectiveness of the cooling air in maintaining the walls of the combustion chamber 21 at an acceptably low temperature is enhanced when compared with that of chambers 21 provided with axial cooling air flows. Additionally, the efficiency of the combustion process which takes place within the combustion chamber 21 is improved. This in turn, together with the improved cooling, brings about a reduction in the amount of undesirable emissions from the combustion chamber 21, specifically the oxides of nitrogen, carbon monoxide, unburned hydrocarbons and smoke.

This is because the undesirable emissions which tend to accumulate in the circumferential films of air exhausted from the holes 29 and 32 have a higher residence time within the chamber 21 than prior art devices in which the air films flow in an essentially axial direction. Consequently there is a greater opportunity for the combustible elements of the emissions to be consumed in the combustion process taking part within the chamber 21. Moreover, since the walls of the combustion chamber 21 are cooled more effectively than in the case of prior art devices, less air is required for cooling, thereby releasing more air for direct use in the combustion process. This means that more air can be directed into the combustion zone 21*a* through the holes 40. This in turn leads to a reduction in the formation of the oxides of nitrogen in that zone.

Figure 4:
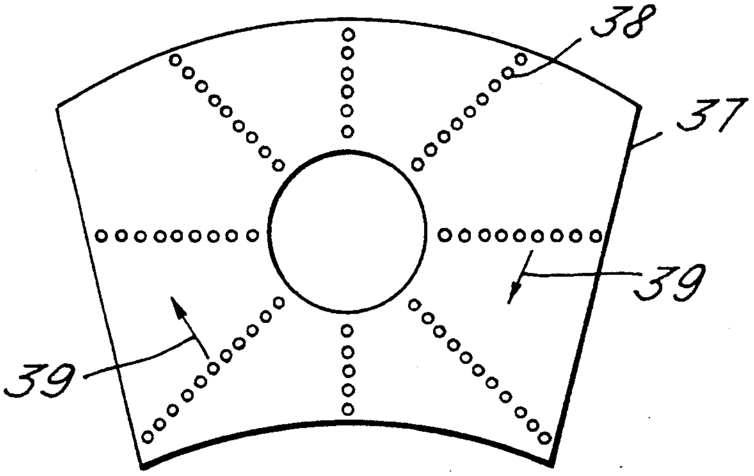
FIG. 4 is a view corresponding with that of FIG. 3 and showing the upstream end of an alternative form of combustor.

Although the present invention has been described with reference to a combustion chamber 21 which is one of a number of similar chambers 21 positioned around the gas turbine engine 10, it will be appreciated that is also applicable to combustion chambers of the well known annular type and the other well known types. A gas turbine engine would be provided with just one of such chambers. In applying the present invention to it, the radially inner and outer walls defining the chamber would each be provided with cooling air holes configured and arranged as described earlier to provide generally circumferential cooling air flows over the combustion chamber internal surfaces about the longitudinal axis of the engine. The heat shields at the upstream end of the combustor would be configured as the one 37 shown in FIG. 4 with cooling air holes 38 to provide a swirling flow of cooling air in the direction generally indicated by the arrows 39.

It will also be appreciated that the cooling air holes 29 and 32 can be of any suitable configuration to produce the desired films of cooling air. Thus, for instance they could be of circular cross-section or in the form of slots.

We claim:

1. A gas turbine engine combustor comprising a combustion chamber having an axis and being defined by walls which, in operation, contain the combustion process and separate the process from a region of pressurized cooling air, said walls having a first set and a second set of holes with said holes of said first set being of larger diameter than the holes of said second set, said combustion chamber having an upstream end and a cylindrical portion extending from said upstream end and about said axis, said holes of said first set being located adjacent said upstream end of said combustion chamber and said holes of said second set being distributed about said axis of said combustion chamber in said cylindrical portion of said combustion chamber and over a major portion of said combustion chamber, said holes of said second set being so configured and arranged as to direct cooling air as a film into said combustion chamber in a flow direction which is generally normal to the general direction of gas flow and said axis within said combustion chamber and oblique to the portion of the combustion chamber wall local thereto.

2. A gas turbine engine combustor as claimed in claim 1 wherein said combustion chamber includes at least one heat shield located at the upstream thereof and means for supporting a fuel injection nozzle associated with the or each said heat shield, the or each heat shield having cooling air holes so configured and arranged as to direct the air passing through said holes in a swirling motion about its associated fuel injection nozzle support means.

3. A gas turbine engine combustor as claimed in claim 1 wherein at least some of said cooling air holes are arranged in rows.

4. A gas turbine engine combustor as claimed in claim 1 where all of said holes of said first set are so configured and so arranged that the cooling air exhausted in operation therefrom is exhausted in a direction that bears the same angular relationship relative to said axis of said combustion chamber.

5. A gas turbine engine having an annular array of combustors with each said combustor being defined as in claim 1.

* * * * *